US006830602B2

United States Patent
Norman

(10) Patent No.: US 6,830,602 B2
(45) Date of Patent: Dec. 14, 2004

(54) DEVICE FOR A VENTILATION SYSTEM

(76) Inventor: Conny Norman, Stallgatan 12, SE-702 26, Örebro (SE)

( * ) Notice: Subject to any disclaimer, the term of this patent is extended or adjusted under 35 U.S.C. 154(b) by 7 days.

(21) Appl. No.: 10/333,694
(22) PCT Filed: Jul. 26, 2001
(86) PCT No.: PCT/SE01/01675
§ 371 (c)(1), (2), (4) Date: Jan. 23, 2003
(87) PCT Pub. No.: WO02/10649
PCT Pub. Date: Feb. 7, 2002

(65) Prior Publication Data
US 2004/0025483 A1 Feb. 12, 2004

(30) Foreign Application Priority Data
Jul. 28, 2000 (SE) .............................................. 0002782

(51) Int. Cl.[7] .............................................. B01D 45/08
(52) U.S. Cl. ...................... 55/442; 55/465; 55/DIG. 36; 126/299 F
(58) Field of Search ................... 55/442, 465, DIG. 36, 55/DIG. 46; 126/299 D, 299 E, 299 F

(56) References Cited

U.S. PATENT DOCUMENTS

| | | | | |
|---|---|---|---|---|
| 2,813,477 A | * | 11/1957 | Gaylord ................... | 126/299 E |
| 3,522,000 A | * | 7/1970 | Kinney ................... | 423/243.06 |
| 3,813,856 A | * | 6/1974 | Jensen ........................ | 55/444 |
| 3,870,494 A | * | 3/1975 | Doane ........................ | 55/443 |
| 4,266,529 A | | 5/1981 | Gaylord .................. | 126/299 D |
| 4,607,614 A | | 8/1986 | Higashino et al. ...... | 126/299 E |
| 5,135,550 A | * | 8/1992 | Telchuk et al. ............... | 95/202 |
| 5,540,214 A | * | 7/1996 | Boudreault ............. | 126/299 E |
| 6,241,809 B1 | * | 6/2001 | Hopkins ..................... | 95/216 |

FOREIGN PATENT DOCUMENTS

| | | | | |
|---|---|---|---|---|
| GB | 1491672 | * | 11/1977 | |
| GB | 1566718 | * | 5/1980 | |
| JP | 60-147044 | * | 8/1985 | ............. 126/299 D |
| WO | WO 96/11047 | * | 4/1996 | |

OTHER PUBLICATIONS

* References Xd were cited by applicant in the specification.*

* cited by examiner

Primary Examiner—Richard L. Chiesa
(74) Attorney, Agent, or Firm—Kilpatrick Stockton LLP

(57) ABSTRACT

Device for extraction of greases in aerosol form from an air flow in a ventilation system, which device includes a number of intermediate plates which define both an increased surface of deposition for the greases, and an extended flow path in the ventilation system, which flow path exhibits an alternating direction of flow and an alternating cross sectional area. According to the invention, each intermediate plate exhibits a turbulence inducing wing, along a free edge thereof which forms the highest situated point or line in each intermediate plate in the device, which wing is directly followed in the flow path by an increased cross-sectional area for the air flow.

16 Claims, 1 Drawing Sheet

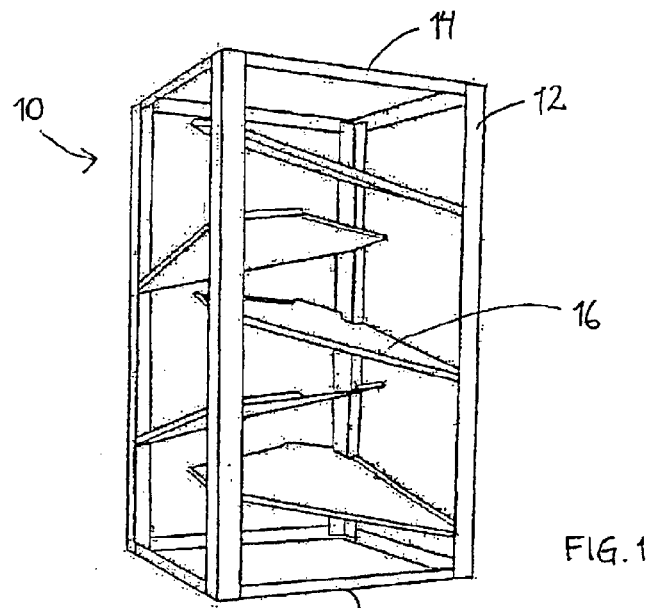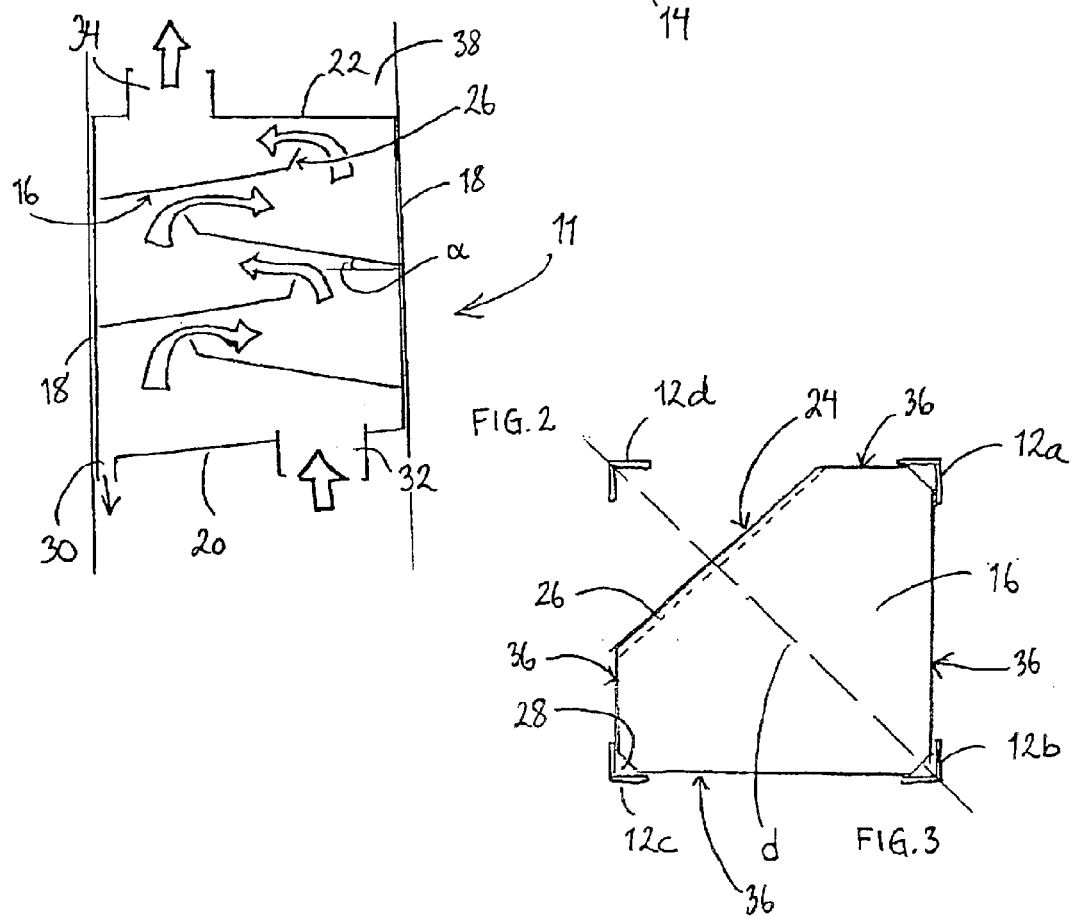

DEVICE FOR A VENTILATION SYSTEM

TECHNICAL FIELD

The present invention relates to a device for extraction of greases in aerosol form from an air flow in a ventilation system, which device comprises a number of intermediate plates which define both an increased surface of deposition for the greases, and an extended flow path in the ventilation system, which flow path exhibits an alternating direction of flow and an alternating cross sectional area.

BACKGROUND OF THE INVENTION

In ventilation ducts from kitchens, especially restaurant kitchens such as hamburger bars and the like, greases in aerosol form ("smell of frying") accompanying the exhaust air from frying-hearths and deep-frying pans e.g., are deposited due to inadequate filtration in existing filters. The deposition of these greases takes place in the entire ventilation duct, all the way up to the fan housing, whereby it gives rise to a risk of extensive fire in the entire duct. Due to this, ventilation ducts in restaurant kitchens must today be cleansed at short intervals and at very high costs, in order to prevent incrustation among other things and to prevent major damage caused by fires.

Various devices intended to diminish or eliminate problems with depositions of greases in ventilation ducts, are previously known. In GB 1,491,672 e.g., a static impeller is presented, which is intended to give rise to a rotation in the air flow through the duct, in order to centrifuge particles of grease towards the walls and allowing them to flow down along the same. The intended effect of the impeller ought however be marginal, since only a minor rotation can be accomplished by a static impeller. The same problem ought to arise in connection with the device shown in WO 96/11047, which also comprises a static impeller intended to give rise to a rotation in a gas flow.

In U.S. Pat. No. 4,607,614, an especially designed hood for a ventilation system is presented, which exhibits plates that deflect the air flow in alternating directions for the creation of a turbulent flow with velocity changes. The air flow is moreover distributed over the width of a special grease collecting arrangement, over a number of ducts having baffles that create a rotating flow in the same. Spray nozzles are arranged to spray water through the air flow in order to achieve a scrubber effect and the resulting grease-mixed water is drained off through an outlet arranged at the lower end of the hood. Even if the device shown in U.S. Pat. No. 4,607,614 ought to have a good degreasing effect, it is far too complicated and thereby inevitably expensive, for it to be used in any greater extension.

This is especially the case since the restaurant in question must exchange the entire of their existing hoods for the especially designed hood according to U.S. Pat. No. 4,607,614.

U.S. Pat. No. 3,870,494 is showing an insert for a ventilation hood. The insert exhibits a number of parallel flow paths between a number of inlets 30 and a number of outlets 31. In each flow path, the air flow only passes two inclined intermediate plates, namely the plates 36 and 37. It is stated to be important to keep the pressure drop low, which is the reason for the large inlet and outlet openings and the low number of intermediate plates.

U.S. Pat. No. 3,813,856 is showing an insert very much alike the one shown in U.S. Pat. No. 3,870,494, with the exception that the intermediate plates are not inclined.

U.S. Pat. No. 4,266,529 is showing an insert where three inclined walls 40, 41, 45 are consecutively arranged in a ventilation hood, see FIG. 4. The intermediate plates exhibit a free, bent edge 42 which is placed at the lowermost point or line in the purpose of catching and diverting caught grease.

GB 1,566,718 is not related to a grease trap for a ventilation system, but is related to a free standing device for the removal of washing liquid remaining in a gas flow after a scrubber for the gas flow. In the introduction of the document, there is a discussion of the problems that are considered to arise in connection with the use of planar, possibly inclined intermediate plates. The solution to these problems is, according to the document, the use of curved intermediate plates, which are arranged to define a sinusoidal flow path for the gas flow. Hereby, there is achieved a centrifugation effect which brings liquid in the gas flow to deposit on the curved intermediate plates, to form a liquid flow on the same. When this liquid flow reaches a flange 26, 28 at an upper, free edge of the intermediate plate, the liquid is caught by the flange and falls directly down into a collecting reservoir.

Accordingly, there is a need today for a relatively simple and thereby relatively cheap, passively operating and thereby reliable in operation, grease trap which may be mounted in existing ventilation ducts in a simple way.

BRIEF DESCRIPTION OF THE INVENTION

The present invention aims at presenting a device for the trapping of greases in aerosol form from an air flow in a ventilation duct, which device eliminates or at least diminishes the problems mentioned above. The invention aims especially at presenting such a device which, despite the fact that it is of relatively simple design, exhibits increased surfaces for deposition of the greases and an extended flow path in the ventilation system, which flow path exhibits an alternating direction of flow and an alternating cross sectional area, whereby a turbulent air flow of varying direction and varying velocity is achieved. Hereby, the agglomeration of grease particles and the deposition of the same on the deposition surfaces, is favoured. Furthermore, the invention aims at presenting such a device which is self-rinsing, thanks to all main deposition surfaces sloping towards an outlet in a lowermost point of the device. It is also an object of the invention to present such a device which may be mounted in an existing ventilation duct, e.g. directly above a ventilation hood, but upstream an air flow inducing device, i.e. a fan.

These and other objects are achieved by the device according to the invention, such as presented in the claims.

The fundamental principle behind the function of the device is that an increased cross sectional area and an extended flow path for the air flow is achieved in a given room, i.e. a given section of a ventilation duct, the cross-sectional area preferably being at least 100% larger than the cross-sectional area of the existing ventilation duct, at the same time as increased deposition surfaces and a flow path that constantly changes direction, is achieved. Moreover, the cross-sectional area in the thus created, extended flow path varies all the time, which means that the air will be forced to flow alternatingly with a high velocity, in order to then abruptly turn into a very low velocity. Together with turbulence creating means, this leads to beneficial conditions for the grease particles to merge and then to fall down on the deposition surfaces when the air velocity decreases.

DETAILED DESCRIPTION OF THE INVENTION

In the following, the invention will be described in greater detail with reference to the drawings, of which:

FIG. 1 is showing the inner part of a device according to the invention, seen in perspective, FIG. 2 is schematically showing an inner part according to FIG. 1, which is surrounded by outer walls, a bottom and a top, inlet(s) and outlet(s) being arranged in these, FIG. 3 is showing an intermediate plate in the device according to FIG. 1, seen form above and mounted in three of four corner posts.

An inner part, generally denoted 10, of the device according to the invention, is shown in perspective in FIG. 1. This inner part 10 is, according to FIG. 2, surrounded by outer walls 18, a slightly sloping bottom plate 20 and a top plate 22, to form a cassette 11 which is intended to be installed in a, usually existing, ventilation duct 38 in a ventilation system. Suitably, the cassette 11 is arranged in the ventilation duct, directly on top of a ventilation hood which is arranged above a frying-hearth or a deep-frying pan, but upstream an air flow inducing device, i.e. a fan (not shown). In this connection, the device exhibits a small inlet opening 32 for the air flow in connection with a first end of the device and a small outlet opening 34 for the air flow in connection with a second, opposite end of the device, said inlet opening 32 and/or said outlet opening 34 exhibiting an open area which preferably is 20% at the most of the area of the existing ventilation duct. In the lower end of the sloping bottom plate, there is arranged a grease outlet 30, leading to a collecting receptacle (not shown) which may be emptied at intervals.

The inner part 10 according to FIG. 1, is exhibiting a square or rectangular cross-section, with four corner posts 12 of L-profile, which are suitably held together by a frame 14 in a first and a second end respectively, of the inner part 10. Intermediate plates 16 are fixedly mounted on the corner posts 12, which intermediate plates define both an increased deposition surface for the greases coming with the air which is drawn through the device, and an extended flow path in the ventilation system, which flow path exhibits a varying flow direction and a varying cross-sectional area.

A preferred embodiment of the intermediate plates 16, all of which preferably being of the same design, is shown in FIG. 3, seen from above. The intermediate plate may be formed from a rectangular plate, or as is shown here from a quadratic plate, which exhibits a diagonally cut edge 24 at one of its corners, so that about 10–35%, preferably 10–30% of its area is lacking in this corner. The plate is moreover bent at this diagonally cut edge 24, to form a turbulence inducing wing 26, which is suitably arranged to mainly extend upwards in the device. The other three corners of the intermediate plate 16 are preferably also cut, so that at most 5% of the area of the plate is lacking at each of these three corners. The intermediate plate 16 is attached, spot welded e.g., to these three corners at three of the corner posts 12a, 12b, 12c, to form outlets 28 for the greases at these corners. Each intermediate plate 16 and outlet 28 has an individual grease separating function and is consequently independent of the other intermediate plates and outlets, which means that the greases will not have to flow over each of the plates but flow off from each and everyone of them.

The open space which is created between the diagonally cut edge 24 and the fourth corner post 12d forms the main open flow area for passage of the air flow past the intermediate plate 16. A smaller, turbulence contributing flow area is moreover preferably created between the other peripheral edges 36 of the intermediate plate 16 and the outer walls 18. These peripheral edges 36 are suitably slightly bent so that they resiliently, but not sealingly, abut the outer walls 18, whereby vibrations are avoided in the device. Possibly, there may be performed a spot-wise attachment of the intermediate plates 16 against the outer walls 18, at these slightly bent peripheral edges.

A number, suitably 3-10, preferably 3-7, of intermediate plates 16 are consecutively arranged in the device 10 in the net air flow direction through the device. Each intermediate plate is arranged with an 180° turn in relation to the next intermediate plate, along a line which is defined by a diagonal d between two of the corner posts 12b, 12d. Hereby, the air flow is forced to take a zigzag path through the device. The intermediate plates 16 are moreover sloping the angle $\alpha$, which is about 20–45°, in relation to a plane which is perpendicular to the outer walls 18 of the device, towards the outlet opening 30 for the greases in the bottom plate 20 (FIG. 2). The slope is such that the diagonally cut edge 24 forms the highest situated point or line in every intermediate plate. The attachment points for each intermediate plate are moreover, according to a conceivable embodiment, arranged at different heights at each of the three respective corner posts 12a, 12b and 12c, so that each intermediate plate slopes in more than one direction in the device. For each intermediate plate 16, the lowermost point is the corner which is diagonally opposite the diagonally cut edge 24. Due to the slope of the intermediate plates and their 180° turned, consecutive order, the turbulence inducing wing 26 will be directly followed in the flow path by an increased cross-sectional area for the air flow, which is best shown in FIG. 2. Hereby, there is created a varying cross-sectional area for the flowpath, which is beneficial for grease separation, whereby the air flow interlarded with grease is forced to an alternatingly high and low velocity, respectively, with a turbulence. This leads to that beneficial conditions are created for the grease particles in the air to merge and then fall down onto the deposition surfaces when the air velocity decreases, which deposition surfaces consist of the intermediate plates 16 and also the outer walls 18. As all deposition surfaces 16, 18, 20 slope towards the grease outlet 30, the greases will be self-drained in an effective way towards this outlet 30. An advantage of the device is that the outer walls 18 are cooling, which promotes the condensing of the greases. In order to further improve the condensing, the outer walls 18 may in certain cases be cooled (not shown). This may be achieved e.g. by jacket-cooling by aid of a cooling medium which consists of air, water or any other cooling medium suitable for the purpose.

Cleansing of the device will not have to be performed very often, but when it is to be done wash liquid is sprayed in through the upper opening of the device, preferably when the device is in its place in the ventilation duct. Alternatively, the device may be provided with a number of injection openings (not shown), suitably at least one between each intermediate plate. Most preferred, the device is provided with a flush device, possibly in the form of a soda wash or a steam wash or the like, or alternatively a high pressure water wash.

It may also be suitable to provide the device with a fire draught valve which automatically closes the through flow path if a fire should occur. This may be realised by a spring-loaded hatch which is hinged in an open position by aid of powder thread, which will burn off if fire flames occur.

The invention is not limited to the embodiment shown but may be varied within the scope of the following claims. It is e.g. to be realised that the design of the intermediate plates, as well as their attachment, may be performed in other ways, the essential aspect being that the intermediate plates create an extended flow path for the air flow, at the same time as increased deposition surfaces are achieved and a flow path that constantly changes its direction and cross-sectional area, and that the device forms a cassette which may be installed also in existing ventilation ducts, by these being cut off and the cassette being mounted. It is also to be realized that the device according to the invention does not have to be arranged to stand in the ventilation duct, but that it also may be arranged lying down or inclined, whereby the inclination however should be such that the extension of the deposition surfaces deflects from the horizontal plane and whereby the grease outlet is always arranged in the lowermost point of the device. Furthermore, it is to be realised that the inlet and the outlet for the air flow also may be arranged in opposite ends of the outer walls of the device, instead of in the bottom and top plate, respectively.

What is claimed is:

1. Device for extraction of greases in aerosol form from an air flow in a ventilation system, which device comprises a number of intermediate plates which define both an increased surface of deposition for the greases, and an extended flow path in the ventilation system, which flow path exhibits an alternating direction of flow and an alternating cross sectional area, characterized in that each intermediate plate exhibits a turbulence inducing wing, along a free edge thereof which forms the highest situated point or line in each intermediate plate in the device, which wing is directly followed in the flow path by an increased cross-sectional area for the air flow; which device is further characterized in that it is of a rectangular or quadratic cross-section, exhibiting four corner posts and each intermediate plate being mounted in three of these corner posts, while an open flow area is created at the fourth corner post.

2. Device according to claim 1, characterized in that it exhibits surrounding outer walls and a small inlet opening for the air flow, in connection with a first end of the device, and a small outlet opening for the air flow in connection with a second, opposite end of the device.

3. Device according to claim 1, characterized in that said intermediate plates are 3-10 in number, and that they are individually and consecutively arranged in a net air flow direction through the device.

4. Device according to claim 2, characterized in that said intermediate plates are fixedly mounted in the device such that each intermediate plate slopes at an angle in relation to a plane which is perpendicular to the outer walls of the device, towards an outlet opening for the greases in a bottom plate of the device.

5. Device according to claim 1, characterized in that each intermediate plate is formed from a rectangular or quadratic plate, which exhibits a diagonally cut edge at one of its corners, so that about 10–35% of its area is lacking at this corner, for the main creation of said flow path, said cut edge being bent in relation to a main extending surface of the plate, for the formation of said turbulence inducing wing.

6. Device according to claim 1, characterized in that all intermediate plates exhibit mainly the same design, and that they are mounted in the device such that each intermediate plate is arranged at an 180° turn in relation to an intermediate plate arranged next to it, along a line which is defined by a diagonal between two of said corner posts.

7. Device according to claim 1, characterized in that each of the corner posts exhibit an L-profile, whereby each intermediate plate exhibits a cut corner, in a position where it is mounted at the respective three corner posts, so that 5% at the most of the area of the plate is lacking at this corner, for the formation of an outlet for the greases at this corner.

8. Device according to claim 2, characterized in that smaller flow paths for the air flow are created between the outer walls and the other peripheral edges of the intermediate plates.

9. Device according to claim 1, characterized in that it is designed as a cassette, adapted to be installed in a ventilation duct in the ventilation system.

10. Device according to claim 5, characterized in that smaller flow paths for the air flow are created between the outer walls and the other peripheral edges of the intermediate plates.

11. Device according to claim 2, wherein the inlet opening and/or outlet opening exhibit an open area which constitutes 20% at the most of the area of the ventilation duct.

12. Device according to claim 3, wherein the intermediate plates are 3-7 in number.

13. Device according to claim 4, wherein each intermediate plate slopes at an angle of about 20–45°.

14. Device according to claim 5, wherein each intermediate plate is lacking 10–30% of its area at the corner exhibiting the diagonally cut edge.

15. Device according to claim 8, wherein the other peripheral edges of the intermediate plates are bent.

16. Device according to claim 10, wherein the other peripheral edges of the intermediate plates are bent.

* * * * *